(No Model.) 2 Sheets—Sheet 1.

J. Q. ADAMS.
EAR CORN CONVEYER FOR CORN SHELLERS.

No. 538,400. Patented Apr. 30, 1895.

Witnesses:
C. F. Blake
Allan A. Murray

Inventor
John Q. Adams.
By Coburn & Thacher
Attys

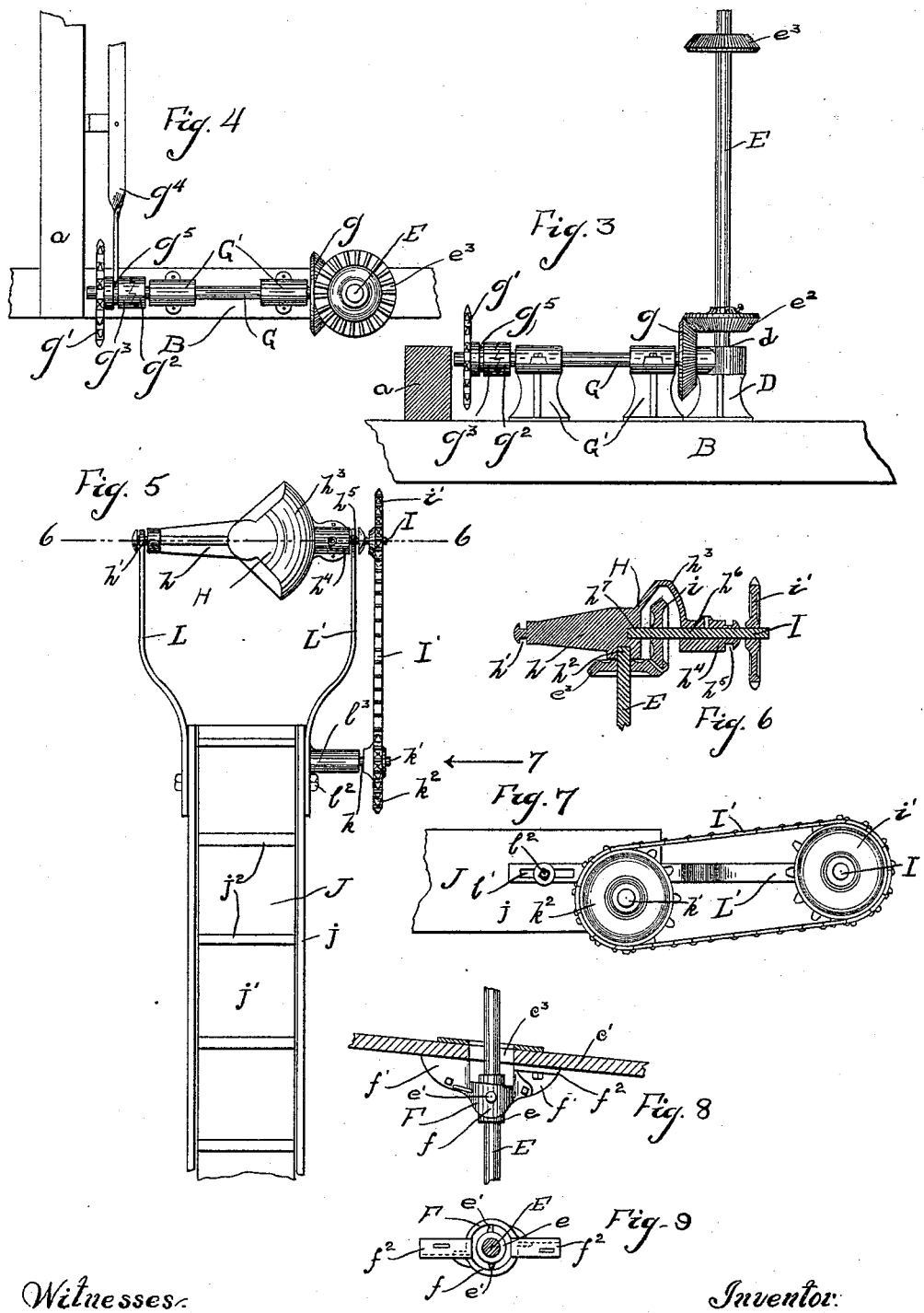

UNITED STATES PATENT OFFICE.

JOHN Q. ADAMS, OF MARSEILLES, ILLINOIS.

EAR-CORN CONVEYER FOR CORN-SHELLERS.

SPECIFICATION forming part of Letters Patent No. 538,400, dated April 30, 1895.

Application filed July 30, 1894. Serial No. 519,042. (No model.)

*To all whom it may concern:*

Be it known that I, JOHN Q. ADAMS, a citizen of the United States, residing at Marseilles, in the county of La Salle and State of Illinois, have invented certain new and useful Improvements in Ear-Corn Conveyers for Corn-Shellers, which are fully set forth in the following specification, reference being had to the accompanying drawings, in which—

Figure 1:
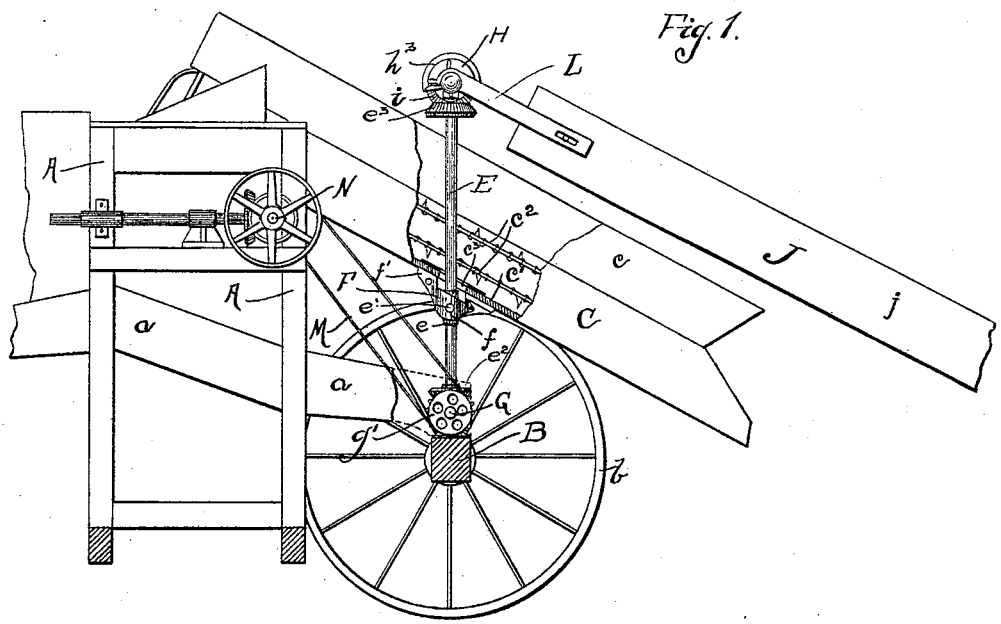
Figure 2:
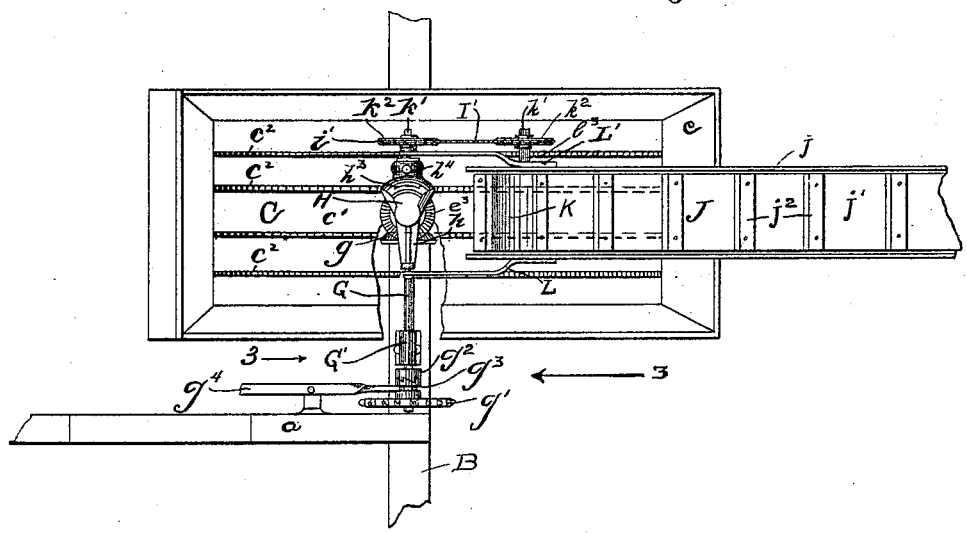

Figure 1 represents a side elevation of a portion of a corn-sheller embodying my invention at the front end of the sheller and with one side of the feed-trough partly broken away; Fig. 2, a plan view of the same; Fig. 3, a detail elevation of the ear-corn-elevator driving mechanism detached looking in the direction of the arrow 3 at Fig. 2; Fig. 4, a plan view of the same; Fig. 5, a plan view of the said elevator detached; Fig. 6, a detail section taken on the line 6 6 of Fig. 5; Fig. 7, a detail side elevation of the driving device for said elevator looking in the direction of the arrow 7 at Fig. 5; Fig. 8, a detail side elevation showing the mounting of the elevator upright drive-shaft at the trough of the feed-elevator, the floor of the latter being in section; and Fig. 9, a plan view of the same.

In the drawings Figs. 1 and 2 are upon one scale, and the remaining Figs. 3 to 9, inclusive, are upon another and enlarged scale.

My invention relates to the machine generally known as a power corn sheller, and this machine may be of any known construction, as the present invention does not relate to any particular type of corn sheller.

The invention consists in a supplementary conveyer device which is designed and intended to be used for elevating or conveying the ears of corn from the ground to the feed elevator into the trough of which they are delivered from the upper end of this supplementary elevator; and this additional device is constructed so that it may be turned or swung freely in any direction and is long enough to reach out some distance from the machine, so that it may be brought to loads, piles, or cribs of corn some way off from the machine proper and deliver the corn properly into the trough or hopper of the regular feed elevator on the sheller.

The construction and operation of a machine embodying my invention will now be described in detail so far as is necessary to an understanding thereof, and the particular improvements which I believe to be new will then be more clearly defined in the claims.

As the construction of the corn sheller proper, as stated above, may be of any well known form, it is not required here to show and describe the full machine. Only a small portion of the sheller at the front end thereof is, therefore, shown in the drawings, and the main features of even this section need only a general reference.

In the drawings, A, represents the main frame of the sheller, only the front portion thereof being shown. These machines are usually mounted on wheels for ready transportation, but only the truck at this end of the machine is shown, consisting of an axle, B, provided with carrying wheels, $b$; and the front end of the sheller frame is supported on this axle by the side beams, $a$, mounted thereon. The feed elevator, C, for the sheller is of ordinary construction, consisting of the usual trough or hopper, $c$, having a bottom, $c'$, from which rise side walls all around and in which are mounted and run the well known feed chains, $c^2$. The well known function of this device is to take the ears of corn, which may be shoveled or otherwise delivered into the trough, and carry and deliver them to the shelling devices which are mounted and inclosed in the main frame.

The present improvement, which consists in a mechanism for automatically delivering the ears of corn from a reasonable distance to this feed elevator, will now be described. A standard, D, is mounted on the upper side of the axle about the middle of its length. In the top of this standard there is set the lower end of an upright shaft, E, a suitable step bearing, $d$, being provided in the upper face of the standard for this purpose. The upright shaft, E, is extended up through the bottom of the feed trough between two of the feed chains and some distance above said trough, as seen in Fig. 1, the bottom of the trough being provided with an elongated opening, $c^3$, in the space between two feed chains to accommodate this upward extension of the shaft alongside said chains, as seen in Fig. 1. The feed trough is also connected to the upright shaft where the latter passes through the bottom thereof, so that the shaft is partly supported by the said elevator trough. The device for this purpose is somewhat peculiar and may be described as follows: A kind of bracket, F, is constructed so as to be secured to the under side of the trough bottom and also to allow the shaft to pass up through it and be held therein, preferably by a pivotal connection for purposes of adjustment, as will be hereinafter described. This bracket consists of a central portion, $f$, of circular form and open centrally—that is, it may be called ring-shaped. On opposite sides of this central body are wings or arms, $f'$, extending upward and enlarged outward as they are thus extended, terminating in straight edges adapted to fit the under side of the feed trough bottom and provided with slightly projecting side flanges, $f^2$, through which bolts may be passed to fasten the bracket to the trough bottom, these flanges being preferably arranged on opposite sides of the wings, as seen in Figs. 8 and 9. The upright shaft, E, passes up through the central opening in this bracket, which is immediately below the opening in the trough bottom, and is connected to the bracket by means of a collar, $e$, loose thereon which is connected to the ring body of the bracket by means of pivot pins or trunnions, $e'$, as seen in Figs. 1 and 8. The space between the two wings of the bracket corresponds to the opening in the trough bottom, and this space in both is considerably larger than the shaft, as seen in Fig. 8. The lower end of the shaft is set loosely in its seat bearing but is held in place by the weight resting thereon and its connection to the feed trough near the center of its length. Near the lower end of this shaft there is secured thereto a bevel gear, $e^2$, this gear being preferably fastened to the shaft by a set screw, so that it may be easily removed therefrom. Near the upper end of the same shaft there is a similar bevel gear, $e^3$, which is permanently fixed on the shaft, the latter projecting up a little beyond the gear, as seen in Fig. 3. At the bottom of the shaft, E, and at one side of the standard, D, on which it is seated, there is mounted a horizontal shaft, G, extending between said standard and the side beam, $a$, of the main frame. This shaft is supported by two standards, G', arranged in the space between the standard, D, and the side beam and secured to the upper side of the axle the same as the standard, D. Suitable journal bearings are provided for the shaft on the top of these standards. At the inner end of this shaft, G, there is fixed a bevel gear, $g$, which is arranged to engage with the bevel gear at the lower end of the shaft, E. A chain or sprocket wheel, $g'$, is mounted loosely at the outer end of this shaft so as to slide thereon and is secured thereto at will by an ordinary clutch, one member, $g^2$, thereof being fixed on the shaft, and the other member, $g^3$, a collar hub, on one side of the wheel and so moving with it. The wheel is moved to connect and disconnect the clutch by an ordinary clutch lever, $g^4$, forked at its inner end to engage in a groove, $g^5$, of the wheel collar hub, as seen in Fig. 4.

The support for the ear corn conveyer is a somewhat peculiar device which may be called a cast metal yoke, H, of special construction. The main body, $h$, of the yoke is substantially a straight beam tapering slightly toward the outer end and terminating in a small head around which runs an annular groove, $h'$. At the inner end of this body piece and in the under side thereof is drilled a step recess, $h^2$, which is adapted to receive the upper end of the upright shaft, E, that is, the yoke is set loosely on this upper end of the said shaft and finds a journal bearing thereon. It will be seen that this is the reverse of an ordinary step journal seat. At the inner end of this body section the yoke is spread out laterally and raised to form a kind of curve, thus making what may be called a spreading or flaring cap, $h^3$, as seen in Figs. 2, 5, and 6. The yoke then terminates in a short section, $h^4$, substantially cylindrical in form and having an end groove, $h^5$, like the groove at the other end of the yoke. This end section, $h^4$, is drilled through lengthwise to form a bearing, $h^6$, and the inner end or head of the main body, $h$, is drilled to form a short socket bearing, $h^7$. A short shaft, I, is mounted in these two last named bearings, and near its inner end carries a bevel gear, $i$, fixed thereon, arranged under and within the central cap section of the yoke and engaging with the bevel gear fixed on the upper end of the upright shaft, E. At the outer end of this short horizontal shaft there is a sprocket pinion, $i'$, fixed thereon. It will be seen from this description that the yoke is free to turn about its journal support and that this turning or swinging will never disturb the engagement of the two gear wheels on the respective shafts, E and I.

The supplementary conveyer, J, so far as general construction is concerned, is of any form adapted to carry along ears of corn. As shown in the drawings, it consists of an ordinary elevator frame, $j$, to which is applied an endless apron, $j'$, having cross-slats, $j^2$. This apron is, of course, run over rollers at the respective ends of the conveyer. Only one, however, is shown in the drawings, an ordinary head roller, K, being mounted in bearings at the upper end of the conveyer frame. In carrying out my invention this conveyer is connected at its upper end to the yoke, H, whereby its upper end is supported; but it is evident that a space must be provided between the upper end of the conveyer and the yoke in order that the ears may be delivered freely from the conveyer and dropped down upon the feed elevator. To accomplish this result two arms or bars, L, L', are provided which are secured at their lower ends to the respective sides of the conveyer frame, are spread outward from this attachment somewhat, and at their outer ends are provided with open hooks, $l$, which are adapted to drop into the grooves and over the reduced ends of the yoke, thereby connecting the elevator to this yoke and resting it thereon as a support, the connection, however, being such that the elevator is readily removed or connected to the yoke by reason of the open hooks, which simply rest upon the upper portion of the yoke ends. These arms, L and L', are provided at their lower ends with a short slot, $l'$, through which the fastening bolts, $l^2$, pass to secure the arms to the elevator, thus providing for a slight adjustment of these arms lengthwise, for a purpose hereinafter mentioned. Below the arm, L, there is also provided a projecting stud, $l^3$, which is bored out centrally to form a bearing for the end of the head roller shaft, $k$, which is projected to form an extension, $k'$, at this side of the conveyer, passing out through this journal and stud carrying on its outer end a chain pinion, $k^2$, fixed thereon and corresponding with the similar pinion, $i'$, on the outer end of the shaft, I. A chain, I', is thrown around these two sprocket pinions, whereby motion may be communicated from one to the other. The slots in the supporting arms of the conveyer provide for the separate adjustment of said arms so as to bring the head roller shaft exactly parallel with the shaft, I, which, of course, is necessary for smooth, perfect working and also furnishes means for keeping the chain taut.

Now, it is obvious from the description above that a rotary movement being communicated to the upright shaft, E, as stated, this motion will be transmitted in like manner to the shaft, I, and then through the chain connection just described a further transmission of movement will be communicated to the head roller on the conveyer, giving it a rotation in the proper direction to carry or drive the apron in the usual way and in the proper direction. It remains to describe devices for communicating motion to the shaft, G. This may be accomplished by any suitable mechanism consisting of a chain, M, running over the sprocket wheel, $g'$, on the said shaft and a similar wheel or pinion on a shaft, N, which is one of the sheller shafts, so that the usual revolution of this latter shaft will drive the shaft, G, and so communicate the required motion to the conveyer apron as just described above. It has been explained above that the chain wheel, $g'$, has a sliding movement on the shaft so as to be clutched to or unclutched therefrom, thereby providing for throwing the conveyer into or out of action according as this wheel is connected thereto by the clutch or disconnected therefrom. This supplementary conveyer may be of any reasonable length, and as it is perfectly free to turn upon its support at the upper end, it may be swung from one side to the other of the sheller to the supply of corn, without moving the sheller close up to such supply as is the case with these machines as heretofore used. The ears of corn are placed in the conveyer at or near its lower end by shovels or any other suitable way and are thence carried up by the slatted apron and delivered over the upper end of the conveyer where they drop through the opening between it and the yoke support into the old feed trough, which is substantially the same as heretofore used, and thence is conveyed by the feed chains to the shelling devices. This is a great convenience in the operation of the sheller, resulting in a considerable saving of time and expense. It has been found desirable in these power shellers to have the feed trough adjustable vertically by raising and lowering the lower end thereof. The box bracket, F, secured to the bottom of the feed trough is made adjustable thereon so as to provide for this movement of the trough. Whenever it is desired to change the pitch of the feed the screw bolts which fasten this bracket to the trough bottom are simply loosened, the trough then set at the inclination desired, and the bracket slid into the proper position and again fastened to the bottom. The openings through which the upright shaft, E, passes are made quite large as described, to accommodate this adjustment, and the bearing collar, E, is loose on the shaft so as to provide for the slight sliding movement necessary to permit this adjustment.

It is obvious that in whatever direction the supplementary conveyer is turned, the delivery of the ears of corn into the feed trough will always be at about the same point.

In the description it has been stated that the bevel gear at the lower end of the upright shaft, E, is preferably secured thereto by a set screw. The object of this is to provide for the ready removal of this shaft, for obviously upon loosening the said wheel thereon the shaft may be quickly removed from the machine simply by drawing it up through the bearings, in which it is loosely fitted and the conveyer entirely detached from the sheller.

In the details of mechanical construction there may be changes by modifying some of the devices herein shown and described or substituting others which will perform substantially the same function. These modifications I consider as within the general field of my invention, and contemplate making them in the application of the invention to different machines, or as good mechanical skill may suggest desirable changes.

Having thus described my invention, what I claim to be new, and desire to secure by Letters Patent, is—

1. In a corn sheller, the feed elevator, in combination with an upright shaft seated at its lower end upon a suitable support on the main frame or axle and passing up through and above the feed trough, about mid-way of its length a yoke, H, mounted loosely upon the upper end of the said shaft on which it is free to turn, an independent conveyer frame, $j$, and arms, L, L', secured at one end to the conveyer, extending beyond the upper end of the latter and pivotally connected to the said yoke, with a large, free space between the latter and the upper end of the conveyer frame substantially as described.

2. In a corn sheller, the main or sheller frame, in combination with the feed elevator, an upright shaft, mounted on suitable supports on the main frame or its axle and extending up through and above the feed trough, a bracket box secured to the under side of the feed trough bottom surrounding the said upright shaft and connected thereto by trunnion joints, and a conveyer pivotally connected to the upper end of said shaft, substantially as described.

3. In a corn sheller, the feed trough, in combination with the feed elevator frame, C, the upright shaft, E, mounted by step bearing in a suitable support on the main frame or axle, underneath the feed elevator frame the yoke, H, pivotally mounted on the upper end of said shaft, the conveyer, J, and arms, L, L', fastened to the respective sides of the conveyer and at their outer ends to the respective ends of said yoke, substantially as described.

4. In a corn sheller, the feed trough, in combination with an upright shaft, E, passing up through said trough and provided with a bevel gear, $e^3$, fixed thereon at its other end, a yoke, H, consisting of the main body, $h$, central cap, $h^3$, and end section $h^4$, set on the upper end of the shaft by an inverted step bearing, a horizontal shaft, I, mounted in said yoke and provided with a bevel gear, $i$, fixed thereon and arranged underneath the yoke cap and engaging with the like wheel on the upright shaft, a supplementary conveyer, J, hinged to said yoke, and driving mechanism connecting the shaft, I, with the head roller of said conveyer apron, substantially as described.

5. In a corn sheller, the feed trough, provided with opening, $c'$, in its bottom, in combination with a bracket, F, consisting of central annular body, $f$, and wings, $f^2$, projecting on each side thereof, whereby it is secured to the said trough bottom, an upright shaft, E, set in a suitable bearing at its lower end, passing up through the ring of the bracket and the elevator trough, and connected to said ring by trunnion joints, and a conveyer mounted at one end pivotally on the upper end of said yoke, substantially as described.

6. In a corn sheller, a yoke, H, consisting of a main straight section, $h$, upwardly curved and laterally flaring cap section, $h^3$, and short, straight section, $h^4$, in combination with shafts, E and I, arranged at right angles to each other and provided with bevel gears, $e^3$, and $i$, arranged underneath the central cap section of the yoke and substantially covered thereby, a supplementary conveyer connected to said yoke by suitable hinges, substantially as described.

7. In a corn sheller, the yoke, H, pivotally mounted over the feed trough, in combination with a supplementary conveyer, J, arms or bars, L, L', secured at one end by slots to the respective sides of the conveyer frame, so as to be adjusted lengthwise thereof, and hooked at their upper ends to said yoke, a head roller shaft, $k$, mounted in the upper end of the conveyer frame and extending out at one side thereof, driving shaft, I, mounted in the yoke, sprocket pinions, $i'$, $k^2$, fixed respectively on the ends of said shafts, and chain, I', running over said sprocket wheels, substantially as described.

8. In a corn sheller, a standard, D, mounted on one of the truck axles or main frame, in combination with the feed elevator frame arranged above and passing over said standard, an upright shaft, E, seated in the top of said standard extending up through the feed trough and carrying bevel gears, $e^2$, $e^3$, secured to its opposite ends, yoke, H, pivotally mounted on the upper end of said shaft by an inverted step bearing, conveyer, J, hinged or hooked at its upper end to the said yoke, shaft, I, journaled in the yoke and provided with bevel gear, $i$, and sprocket pinion, $i'$, secured thereon, head roller, K, journaled in the upper end of the conveyer frame and provided with sprocket pinion, $k^2$, chain, I', run over said sprocket pinions, shaft, G, mounted on standards, G', in line with standard, D, and provided with fixed bevel gear, $g$, at its inner end and sprocket wheel, $g'$, at its outer end, and drive chain, M, running over said wheel, $g'$, and a similar sprocket wheel on a shaft of the sheller, substantially as described.

9. In a corn sheller, an upright shaft, E, mounted loosely in a step bearing at its lower end, in combination with a bevel gear, $e^2$, detachably secured to the lower end of said shaft and similar gear, $e^3$, fixed to the upper end thereof, ring bracket, F, secured to the bottom of the feed trough, collar, $e$, fitted loosely on shaft, E, and connected to the ring bracket by pivot pins, a supplementary conveyer pivotally mounted on the upper end of said shaft, and driving mechanism connecting with the upper gear on said shaft to operate the conveyer mechanism, whereby the conveyer and its upright supporting shaft, E, may be readily detached from the sheller by loosening the bottom gear thereon, substantially as described.

10. In a corn sheller, a feed elevator, in combination with an upright shaft supported wholly upon the axle, or some fixed part of the main frame, by a journal seat in which it is free to turn, a feed trough provided with a large opening in the bottom thereof, about mid-way of its length, through which the upright shaft freely passes without journaling therein and extends above the feed trough, a supplementary elevator mounted at its upper end upon the upper end of the said upright shaft, and mechanism secured to the feed trough, adapted to laterally support the upright shaft above its pivot seat, and free to slide up and down on said shaft to permit the vertical adjustment of the feed trough, substantially as described.

JOHN Q. ADAMS.

Witnesses:
A. T. ADAMS,
G. J. CRAM.